No. 760,397. Patented May 17, 1904.

UNITED STATES PATENT OFFICE.

EDWARD C. KIRK, OF LANSDOWNE, PENNSYLVANIA, ASSIGNOR OF ONE-HALF TO WILLIAM JAMES EVANS AND EUSTACE HAROLD GANE, OF NEW YORK, N. Y.

DENTIFRICE.

SPECIFICATION forming part of Letters Patent No. 760,397, dated May 17, 1904.

Application filed October 31, 1903. Serial No. 179,287. (No specimens.)

*To all whom it may concern:*

Be it known that I, EDWARD C. KIRK, a citizen of the United States, residing at Lansdowne, in the county of Delaware and State of Pennsylvania, have invented certain new and useful Improvements in Dentifrices; and I do hereby declare the following to be a full, clear, and exact description of the invention, such as will enable others skilled in the art to which it appertains to make and use the same.

My invention relates to a composition-powder dentifrice having antiseptic, germicidal, and detergent qualities.

It is a well-known fact of chemistry that hydrogen dioxid possesses the property of decomposing dead organic matter by virtue of its oxidizing power, which depends upon the readiness of the hydrogen dioxid to part with one of its atoms of oxygen by which the hydrogen dioxid is converted into water and oxygen. Upon this same oxidizing power the well-known antiseptic and germicidal properties of hydrogen dioxid also depend. These qualities naturally possessed by hydrogen dioxid make it particularly valuable and useful as a cleansing and antiseptic material for use in the mouth, especially as it is non-poisonous and without any deleterious effect upon living tissue. So far as I am aware it is impossible to incorporate hydrogen dioxid into a powder composition without its losing the valuable properties above spoken of, and hence its use as a dentifrice has heretofore been confined to liquid form.

The object of my invention is to produce a dentifrice composition of powder form having as an ingredient a substance which in the presence of the acids of the mouth will be transformed into hydrogen dioxid.

My invention is based on the known fact that peroxids of the alkalies and alkaline earths when brought into contact with acids and sometimes even in contact with moisture undergo decomposition with the formation of hydrogen dioxid by substitution of the base for the hydrogen of the acid.

The invention therefore consists in combining with any of the usual well-known or suitable tooth-powder materials which provide the requisite or desired antacid, detergent, and abrasive or cleansing properties one of the dioxids of the alkaline-earth metals. I have found by research and experiment that of the several such dioxids that of calcium is best adapted to the purpose of my invention. It is possible by incorporating this ingredient in the composition to confer upon a powder dentifrice the antiseptic, detergent, and cleansing properties which hydrogen dioxid possesses in liquid form and at the same time obtain the further advantages which the physical and chemical properties of a powder dentifrice possesses over a liquid dentifrice. These properties are the antacid property of the chalk used as the tooth-powder base and the mechanically-detersive property of the chalk base, which by friction of its ultimate particles helps to mechanically remove adherent deposits upon the surfaces of the teeth. A peculiar value obtained by the addition of calcium dioxid to a tooth-powder base is that whenever a local acid area exists, as in tooth decay or as the result of fermenting food particles between the teeth or around their necks, the locally-formed acid reacts with the calcium dioxid, and the acid is neutralized by the calcium, and hydrogen dioxid is liberated, which then exerts its germicidal and oxidizing property at the exact location where such action is most needed as a therapeutic means. In short, the calcium dioxid has a selective tendency for those locations where local acidity is exerting destructive action upon the tooth structure.

For practical purposes I have ascertained that about two per cent. of calcium dioxid is sufficient to accomplish the detergent and germicidal ends above described when incorporated in a powder dentifrice intended for habitual daily use, although a smaller or larger proportion may be used, as occasion requires. A suitable dentifrice composition may consist, for example, of ninety-five per cent. precipitated chalk, three per cent. powdered castile soap, and two per cent. calcium dioxid, together with flavoring and coloring matter, as preferred. These proportions may be altered and other ingredients added to or substituted for those mentioned, as desired.

It is obvious that my improved powder dentifrice may be compressed into tablet or lozenge form, if desired.

I claim as my invention—

1. A dentifrice composition consisting of calcium dioxid and an abrading-powder, substantially in the proportions and for the purpose herein specified.

2. A dentifrice composition consisting of calcium dioxid and powdered chalk, substantially in the proportions and for the purpose herein specified.

3. A dentifrice composition consisting of calcium dioxid, powdered chalk and a saponaceous substance, substantially in the proportions and for the purpose herein specified.

In testimony whereof I affix my signature in presence of two witnesses.

EDWARD C. KIRK.

Witnesses:
EDWARD F. SIMPSON, Jr.,
HOWARD K. RUDOLPH.